Patented Sept. 9, 1952

2,609,545

UNITED STATES PATENT OFFICE 2,609,545

FILLING-BODY FOR SURGICAL USE

Jens Herman Bing, Copenhagen, Denmark, assignor to Aktieselskabet Ferrosan, Copenhagen, Denmark, a firm No Drawing. Application November 24, 1950, Serial No. 197,517. In Denmark November 26, 1949

5 Claims. (Cl. 3—1)

It is well known in surgical operations on the human body or animals to fill cavities by spongy bodies of hardened gelatine which will be resorbed when the filling-body has served its purpose, whereby a separate surgical operation to remove the filling-body is avoided. Hitherto, these bodies were produced by incorporating finely divided air into viscous solutions of gelatine and subsequent hardening by heat treatment.

It is likewise known in surgical operations, especially in the pulmonary surgery, to introduce cavity-filling bodies of a more permanent nature for replacing removed tissue and compress the surrounding tissues. It has been proposed for such filling-bodies to employ a bag of polyethylene film containing glass-wool or air. The use of these filling-bodies, however, has presented considerable mechanical drawbacks since it was difficult to adjust them to the size and shape of the cavities in question and in some cases ruptures occurred. Therefore, during these comparatively recent experiments spongy bodies of polyvinylalcohol treated with formaldehyde converted to foam by blowing have been employed. This material, however, does not possess the degree of chemical inertness desirable for filling-bodies which are destined to remain for several years in the human body. Besides, it is not fully excluded that the introduction of such bodies will cause inflammation in the surrounding tissue.

One object of the present invention is to provide a body for the filling of cavities in human and animal bodies formed by surgical operations which filling-body is inert towards the tissues and liquids in said bodies, even for periods of several years, and whereby the above mentioned disadvantages are avoided.

Another object is to provide a method for producing such filling-bodies and preformed masses from which filling-bodies of the desired shape can be divided out by the consumer, and fixing the shape of these bodies and preformed masses by a surface treatment of the same.

A third object is to provide a method by which a filling-body of said kind for replacing a part of an organ, for instance a lung, conveniently and in short time can be given a fixed shape exactly corresponding to said part.

As far as the chemical properties concern—especially the capability of being in contact with the living tissue without causing inflammation or otherwise influence the functioning of said tissue and remain chemically unchanged itself—is the most appropriate material for permanent surgical filling-bodies, but this material is difficult to transform into a spongy mass by the methods hitherto used for producing such masses. I have now found that a filling-body possessing the desired mechanical properties can be made of thread-like elements of polyethylene tangled together to form a mass having a spatial network-structure. Furthermore, this mass can easily be divided into pieces, for instance by cutting or by means of a heated knife or string. The density of this mass may be varied from that of a compact felt to that of a loose upholstery material, for instance of curled horse hair or kapok. From this material preformed bodies of any desired shape may be formed in various ways.

According to one method this is done by wrapping the preformed material with threads of polyethylene. According to another method the filling-bodies are built up of flat pieces of surface-network interconnected and held together by threads of polyethylene, for instance by sewing said pieces together thereby forming bodies of the desired shape. The flat pieces can for instance be made by weaving, tangling or felting threads or thread-like elements of polyethylene together.

However, I prefer to fix the shape of the preformed material and the finished filling-bodies by subjecting the bodies to a heat treatment whereby the thread-like elements are welded together at their points of mutual contact or a part of these points. Thereby temperatures above 80–100° C. are to be applied corresponding to the weakening point of the polyethylene used. This may also be effected by a treatment with a solvent capable of dissolving polyethylene at temperatures above 60° C., for instance chlorinated hydrocarbons, and subsequent removing the solvent by evaporation, for instance in a current of hot air. Thereby, however, the bodies may become somewhat stiff, and the process requires a special apparatus. Therefore, this process is not convenient for use in hospitals and cannot be applied for shaping the filling-body during a surgical operation.

I therefore prefer to fix the shape of the filling-bodies by only exposing the surface layer of the body to a heat treatment. This can conveniently be done by passing a flame over the surface of the body or by contacting the surface with a hot surface, for instance of an electrically heated metal plate. Thereby, only the fibres in the neighbourhood of the surface are welded together at their points of mutual contact, so that the filling-body becomes soft with a more or less smoothened surface. However, a fibrous or porous texture may well be retained in the surface layer, and this is in most cases even advantageous, as I have found that the tissues surrounding the filling-body have a marked tendency to grow into the pores and open spaces in the filling-body thereby fixing the position of the same relative to the said surrounding tissues.

Thread-like elements made by turning or planing compact bodies of polyethylene are very appropriate as a material for the production of filling-bodies according to the invention. Turnings (turning chips) made by turning of rods of polyethylene having a comparatively small diameter are curled and therefore particularly easy to tangle together to a coherent material.

The invention also relates to particularly advantageous methods for producing filling-bodies from turnings of polyethylene whereby heat is applied for interconnecting the turnings in the surface layer of the bodies as already described.

According to the first of these methods the tangled material is placed in a metal mould having the desired shape of the body to be produced and provided with means for heating the mould, whereafter the mould is heated to a temperature above the weakening point of the polyethylene. Thereby the turnings are welded together at their points of mutual contact situated in the neighbourhood of the heated walls of the mould. When this has taken place the body is removed from the mould and cooled. This method is particularly advantageous for producing preformed filling-bodies having the shape of a whole organ to be replaced, for instance a kidney.

According to the second method a piece having the shape of that part of an organ, which is to be removed, is divided out from the corresponding part of a body, preformed in the size and shape of this organ and consisting of turnings of polyethylene welded together at their points of mutual contact in the surface layer of the body, whereafter those surfaces of the piece divided out which were formed by the dividing operation is subjected to a heat treatment for welding together the turnings at their points of mutual contact in the surface layer.

Thereby it is possible during a surgical operation to produce a filling-body of the shape required for the exact filling of a cavity the shape of which cannot be ascertained before the operation. It will be understood that this will be facilitated thereby that a part of the surface of the filling-body will be preformed with the shape of the organ at the part in question. This method is particularly useful by pulmonary operations by which only a part of the lung is to be removed. The method requires but little time, which is important by such operations. The preformed body having the shape of the whole lung may preferably be produced by the first mentioned method.

What I claim is:

1. A spongy body for the filling of cavities formed in human and animal bodies in surgical operations which filling-body consists of thread-like elements of polyethylene tangled together to form a mass having a spatial network-structure.

2. An elastic body for the filling of cavities formed in human and animal bodies in surgical operations which filling-body consists of fibres of polyethylene tangled together to an open spatial network and is wrapped with threads of polyethylene.

3. An elastic body for the filling of cavities formed in human and animal bodies in surgical operations which filling-body is built up of flat pieces of surface-network consisting of threads of polyethylene said pieces being interconnected and held together by threads of polyethylene.

4. An elastic body having the shape and size of an interior human organ and consisting of thread-like elements tangled together to form a spatial network in which the elements are welded together at their points of mutual contact in the neighbourhood of the surface of the body.

5. A spongy body having the shape and size of an interior human organ and consisting of turnings of polyethylene tangled together to form an open spatial network in which the turnings have been welded together at their points of mutual contact situated in the surface layer of said body.

JENS HERMAN BING.

REFERENCES CITED

The following references are of record in the file of this patent:

UNITED STATES PATENTS

| Number | Name | Date |
| --- | --- | --- |
| 1,949,111 | Randall | Feb. 27, 1934 |
| 2,072,302 | Herrmann et al. | Mar. 2, 1937 |
| 2,473,723 | Nelson | June 21, 1949 |
| 2,508,156 | Gillman | May 16, 1950 |